(12) United States Patent
Ahn (10) Patent No.: US 8,440,344 B2
(45) Date of Patent: May 14, 2013

(54) SECONDARY BATTERY PACK

(75) Inventor: Jang-Gun Ahn, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 240 days.

(21) Appl. No.: 12/893,952

(22) Filed: Sep. 29, 2010

(65) Prior Publication Data

US 2011/0104519 A1   May 5, 2011

(30) Foreign Application Priority Data

Oct. 30, 2009 (KR) .......................... 10-2009-0104342

(51) Int. Cl.
*H01M 2/26* (2006.01)

(52) U.S. Cl.
USPC .......................................................... 429/161

(58) Field of Classification Search ........................ None
See application file for complete search history.

(56) References Cited

U.S. PATENT DOCUMENTS

| 5,929,600 | A * | 7/1999 | Hasegawa | 320/112 |
|---|---|---|---|---|
| 2005/0122700 | A1 * | 6/2005 | Kim et al. | 361/795 |
| 2005/0190531 | A1 * | 9/2005 | Gall et al. | 361/600 |
| 2008/0289861 | A1 | 11/2008 | Lee | |

FOREIGN PATENT DOCUMENTS

| JP | 06-169139 A | 6/1994 |
|---|---|---|
| KR | 1020060028175 A | 3/2006 |

OTHER PUBLICATIONS

Machine translation of JP 06-169139, retrived from <http://www19.ipdl.inpit.go.jp/PA1/cgi-bin/PA1DETAIL> on Aug. 31, 2012.*
Machine translation of KR 1020060028175, retrived from <http://kposd.kipo.go.kr:8088/up/kpion/> on Aug. 31, 2012.*
KIPO Office action dated Nov. 8, 2011, for Korean priority Patent application 10-2009-0104342, (1 page).

* cited by examiner

*Primary Examiner* — Cynthia Walls
(74) *Attorney, Agent, or Firm* — Christie, Parker & Hale, LLP (57) ABSTRACT

A secondary battery pack having a connecting member connecting a secondary battery to a protection circuit module. The secondary battery pack includes at least one secondary battery; a case accommodating the battery; a protection circuit module to protecting the battery; and a connecting member connecting the at least one secondary battery to the protection circuit module. The connecting member includes a first plate having a plurality of conductive patterns spaced apart from one another; and a second plate surrounding the first plate. The second plate has at least one cut-away portion on a bent portion of the first plate.

18 Claims, 7 Drawing Sheets

SECONDARY BATTERY PACK

CROSS-REFERENCE TO RELATED APPLICATION

This application claims the benefit of Korean Application No. 10-2009-0104342, filed in the Korean Intellectual Property Office on Oct. 30, 2009, the disclosure of which is incorporated herein by reference.

BACKGROUND

1. Field

Aspects of the present invention relate to a secondary battery pack having a connecting member for connecting a rechargeable battery to a protection circuit module.

2. Description of the Related Art

A battery pack generally includes a battery, a protection circuit module (PCM) controlling charging/discharging of the battery and protecting the battery from overcharge and overdischarge, and a case accommodating the battery and the protection circuit module.

The battery may include a lithium ion battery, a lithium polymer battery and a lithium ion polymer battery. The battery may include a non-aqueous electrolyte. The electrolyte may be a solid polymer containing lithium salt or a liquid polymer in which lithium salt is dissociated in an organic solvent.

SUMMARY

According to aspects of the present invention, there is provided a connecting member of a secondary battery pack, which can minimize the restoring force of the connecting member when the connecting member for connecting a battery in the pack to a protection circuit module.

According to additional aspects of the present invention, there is provided a secondary battery pack capable of improving its workability and yield.

According to an aspect of the present invention, a secondary battery pack is provided. The secondary battery pack includes at least one secondary battery; a case accommodating the battery; a protection circuit module to protect the battery; and a connecting member connecting the at least one secondary battery to the protection circuit module. The connecting member includes a first plate; and a second plate surrounding the first plate. The second plate has at least one cut-away portion on a bent portion of the first plate.

According to an aspect of the present invention, the cut-away portion is a portion at which the second plate is removed on a surface of the first plate.

According to an aspect of the present invention, the cut-away portion is positioned at an inside of the bent portion of the first plate.

According to an aspect of the present invention, the cut-away portion is positioned at an outside of the bent portion of the first plate.

According to an aspect of the present invention, the cut-away portions are respectively positioned at the inside and outside of the bent portion of the first plate.

According to an aspect of the present invention, the cut-away portion extends to intersect the plurality of conductive patterns. The connecting member may further include at least one hole passing through the first plate between the conductive patterns. The connecting member may further include at least one hole passing through the first and second plates or at least one of the conductive patterns. The connecting member may further include a round portion on at least one edge of the second plate in an extension direction of the cut-away portion. The cut-away portion may have a circular arc-shaped section.

According to an aspect of the present invention, the cut-away portion is formed by removing a portion of the second plate between the conductive patterns so as to decrease a thickness of the bent portion. The connecting member may further include at least one hole passing through the second plate at the cut-away portion. The connecting member may further include at least one hole passing through the first and second plates or at least one of the conductive patterns. The connecting member may further include a round portion on at least one edge of the second plate in a direction extending to intersect the conductive patterns. The cut-away portion may have a circular arc-shaped section.

According to an aspect of the present invention, the batteries are connected to one another in series, parallel, or a combination of series and parallel.

According to an aspect of the present invention, the connecting member is a flexible printed circuit board or coverlay.

According to an aspect of the present invention, a welding point at a contact portion between the first plate and the protection circuit module or at a contact portion between the first plate and the battery.

According to an aspect of the present invention, the first plate is a conductive plate, and the second plate is an insulating plate.

According to aspects of the present invention, a connecting member of a secondary battery pack is provided that can minimize the restoring force for approximately vertically folding of the connecting member. Further, by using the connecting member with a limited restoring force for bending at a specific position, it is possible to facilitate the manufacturing process of the secondary battery pack and to reduce failure caused by separating connecting portions from each other in the secondary battery pack. Thus, the yield of the secondary battery pack can be improved. It is also possible to prevent a defect of an application such as a notebook computer with a built-in secondary battery pack, thereby enhancing reliability of the application.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween.

Figure 1:
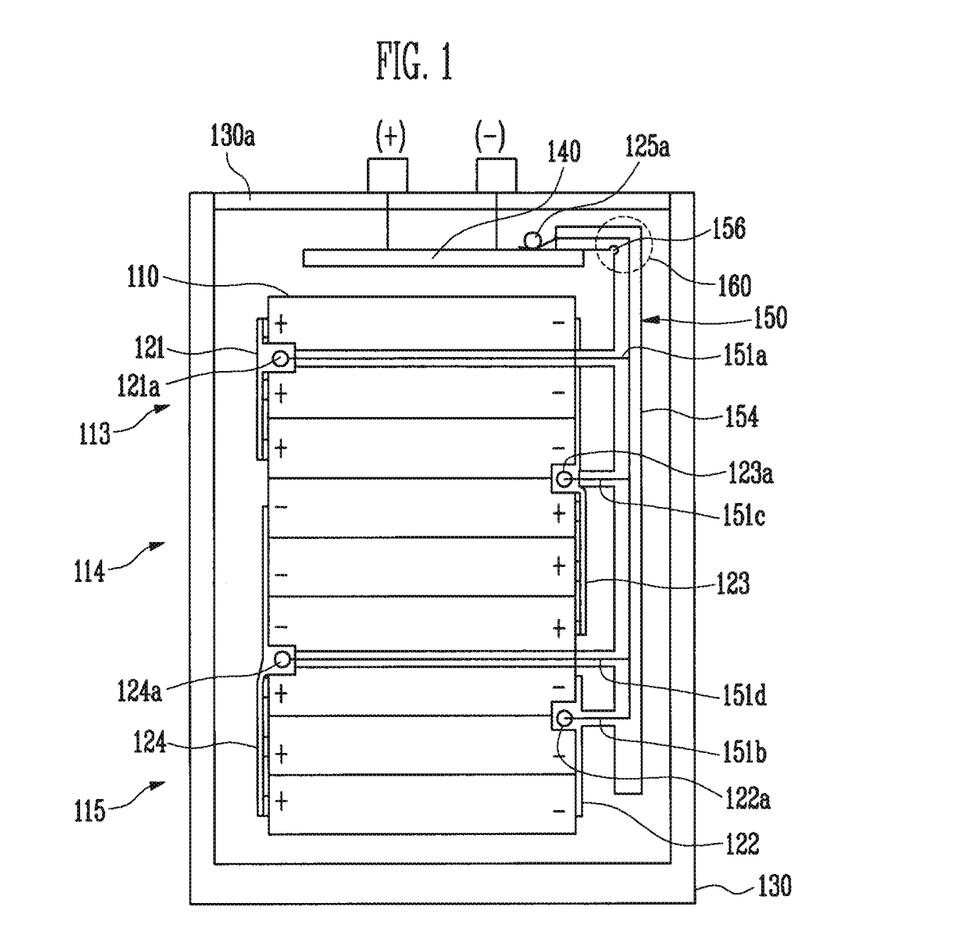
FIG. 1 is a schematic view illustrating the configuration of a secondary battery pack according to an embodiment of the present invention.
Figure 2:
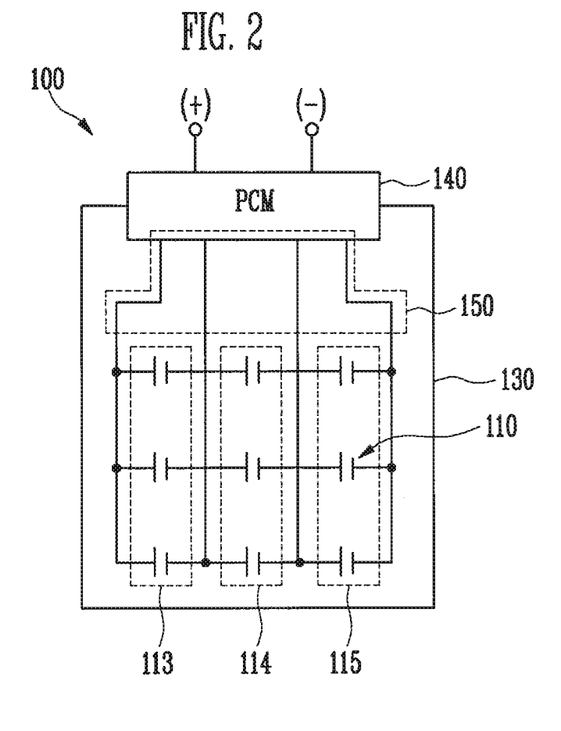
FIG. 2 is a schematic circuit diagram of the secondary battery pack of FIG. 1.
Figure 3:
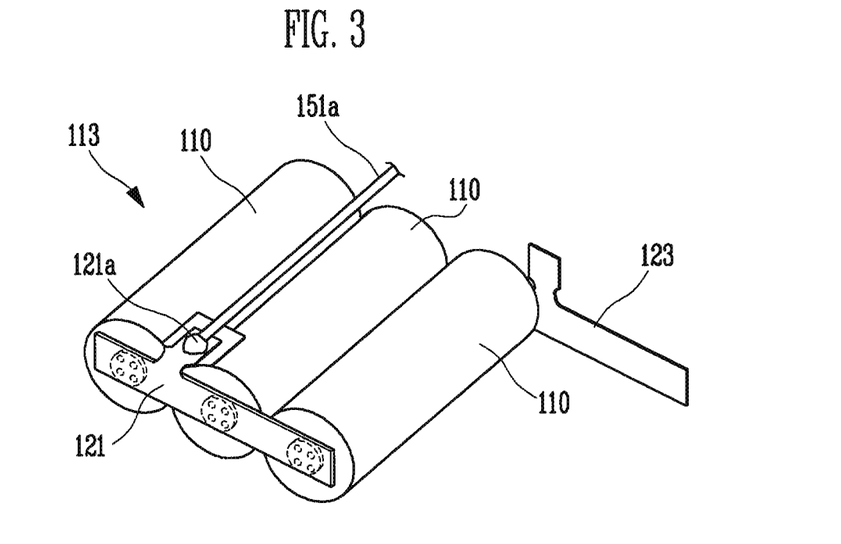
FIG. 3 is a partial perspective view illustrating the secondary battery pack of FIG. 1.

FIG. 1 is a schematic view illustrating the configuration of a secondary battery pack 100 according to an embodiment of the present invention. FIG. 2 is a schematic circuit diagram of the secondary battery pack 100 of FIG. 1. FIG. 3 is a partial perspective view illustrating the secondary battery pack 100 of FIG. 1.

Referring to FIGS. 1 to 3, the secondary battery pack 100 includes a plurality of rechargeable batteries 110, a case 130 accommodating the plurality of batteries 110, a protection circuit module 140, and a connecting member 150. The protection circuit module 140 controls charge/discharge of the batteries 110 and protects the batteries 110 from overcharge and overdischarge. The connecting member 150 connects the protection circuit module 140 to the batteries 110.

The plurality of batteries 110 may be connected to one another in series, parallel, or combination of series and parallel by at least one or more connectors 121, 122, 123, and 124. Although four connectors are shown, fewer connectors or more connectors may be provided. As shown in FIGS. 1-3, the plurality of batteries 110 constitute three banks 113, 114, and 115 connected to one another in series. Each of the banks 113, 114, and 115 includes three batteries 110 connected to one another in parallel.

The protection circuit module 140 has a general structure. For example, the protection circuit module 140 may have a structure in which electronic components constituting a protection circuit are mounted on one surface of an insulative substrate formed of a glass fiber reinforced epoxy resin. The protection circuit module 140 may be connected to the case 130 in such a manner that it is accommodated in the case 130 or attached to an exterior of the case 130. In the example shown in FIG. 1, the protection circuit module 140 is accommodated in the case 130. One opening of the case 130 may be closed by a cover case 130a. The protection circuit module 140 may be provided with positive and negative terminals exposed to the exterior of the case 130.

The connecting member 150 includes a plurality of conductive patterns 151a, 151b, 151c, and 151d, and an insulating layer 154 surrounding these conductive patterns. The connecting member 150 may be configured as a flexible printed circuit board (FPCB) or coverlay. In the example shown in FIG. 1, the first conductive pattern 151a is connected to a positive terminal of the first bank 113. The second conductive pattern 151b is connected to a negative terminal of the third bank 115. The third conductive pattern 151c is connected to a negative terminal of the first bank 113 and a positive terminal of the second bank 114. The fourth conductive pattern 151d is connected to a negative terminal of the second bank 114 and a positive terminal of the third bank 115. Connectors 121, 122, 123, and 124 are respectively joined with the conductive patterns 151a, 151b, 151c, and 151d through a joining process, such as welding. Each of the connectors is connected to an end portion of each of the conductive patterns and the positive terminal and/or the negative terminal of each of the banks. Welding points 121a, 122a, 123a, and 124a may be provided at joint portions between the conductive patterns and the connectors, respectively. When the connectors are omitted, each, of the conductive patterns may be directly joined with positive or negative electrodes of batteries 110.

The connecting member 150 as shown in FIGS. 1-3 may be folded in a manufacturing process of the secondary battery pack 100. For example, if one end of each of the conductive patterns of the connecting member 150 is connected to the batteries 110, the other end of each of the conductive patterns of the connecting member 150 may be connected to the protection circuit module 140. In this case, the other end of the connecting member 150 is joined with the protection circuit module 140 from the exterior of the case 130 through a joining process, and the protection circuit module 140 is then inserted into the case 130. At this time, the connecting member 150 is approximately vertically folded. When the other end of the connecting member 150 is joined with the protection circuit module 140 through a welding process, a welding point 125a may remain at a contact portion between the other end of the connecting member 150 and the protection circuit module 140.

When the connecting member 150 is approximately vertically folded, it has a restoring force tending the connecting member 150 to be unfolded by the plurality of conductive patterns 151a, 151b, 151c and 151d and the insulating layer 154. Thus, a cut-away portion is formed so that the manufacturing operation of the secondary battery pack can be easily performed by reducing the restoring force of the connecting member 150. The cut-away portion may be formed by removing a portion of the insulating layer (hereinafter, referred to as an insulating plate or second plate) on a bent portion 160 of the conductive patterns (hereinafter, referred to as a conductive plate or first plate) of the connecting member 150.

If the cut-away portion is formed at the bent portion 160 of the connecting member 150, the unfolding phenomenon generated by elasticity (restoring force) at the bent portion 160 of the connecting member 150 is substantially removed. Since a mold or jig is not used to bend the connecting member, the manufacturing process of the secondary battery pack is easily performed. Since the position of the bend portion is specified at a specific place, mass production is possible.

If the cut-away portion is not formed at the bent portion of the connecting member, the connecting member is not easily folded, but tends to become unfolded due to the elasticity when it is approximately vertically folded so as to be joined with the protection circuit board in its unfolded state and then inserted into the case. Hence, it may be difficult to join the connecting member with the protection circuit board. After the connecting member is joined with the protection circuit board, the joint portion is also separated due to the elasticity of the bent portion of the connecting member. This can easily result in joint failure.

Figure 4:
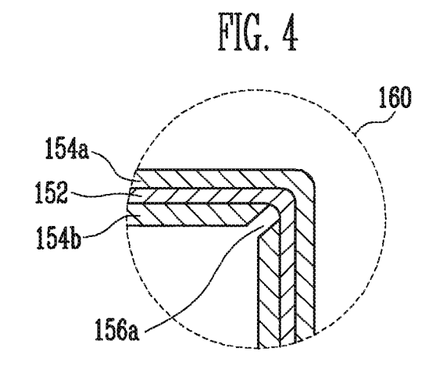
FIGS. 4 to 6 are partially enlarged sectional views illustrating the structures of cut-away portions with various shapes, applicable to the secondary battery pack according to embodiments of the present invention.
Figure 5:
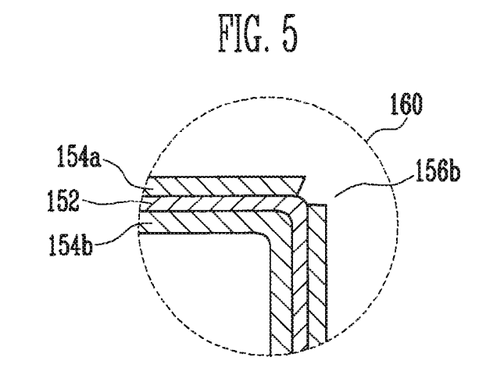
Figure 6:
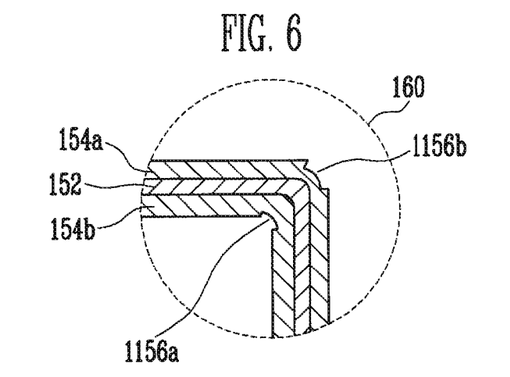

Hereinafter, the structures of cut-away portions with various shapes, applicable to the secondary battery pack 100 will be described. FIGS. 4 to 6 are partially enlarged sectional views illustrating the structures of cut-away portions with various shapes, applicable to the secondary battery pack according to embodiments of the present invention. Each of the enlarged views corresponds to the cut-away portion designated by reference numeral 160 of FIG. 1.

Referring to FIG. 4, an insulating second plate that surrounds a conductive first plate 152 including a plurality of conductive patterns is formed on the bent portion 160 of the connecting member applied to the secondary battery pack. The second plate includes a first insulating layer 154a disposed at one surface of the first plate 152 and a second insulating layer 154b disposed on the other surface of the first plate 152. The other surface (hereinafter, referred to as a second surface) of the first plate 152 forms a surface opposite to the one surface (hereinafter, referred to as a first surface) of the first plate 152 with the first plate 152 interposed therebetween.

The cut-away portion 156a of FIG. 4 has a predetermined size and shape, and is positioned on the second surface of the first plate 152 at an inside of the bent portion 160. The cut-away portion 156a is formed so that the second surface of the first plate 152 is exposed to the exterior at the inside of the bent portion 160.

According to the aforementioned configuration, the bending elasticity of the stacked structure of the first plate 152 and the second plate 154a and 154b is greater than that of each of the first plate 152 with a first elasticity and the second plate with a second elasticity. In the bending elasticity provided when the stacked structure of the first and second plates is folded, the bending elasticity of the second insulating layer 154b of the second plate is removed at the inside of the bent portion 160, so that the bending elasticity of the stacked structure can be considerably reduced, and therefore, the restoring force for folding of the connecting member itself can be reduced. The bending elasticity corresponds to an elastic force or restoring force generated at the folded portion of the connecting member.

The cut-away portion 156 shown in FIG. 5 has a predetermined size and shape, and is positioned on the first surface of the first plate 152 at an outside of the bent portion 160. The cut-away portion 156b is formed so that the first surface of the first plate 152 is exposed to the exterior at the outside of the bent portion 160. According to the aforementioned configuration, in the bending elasticity provided when the stacked structure of the first and second plates is folded, the elasticity (restoring force) of the first insulating layer 154a of the second plate is removed at the inside of the bent portion 160, so that the restoring force for folding of the stacked structure can be reduced, and therefore, the bending elasticity of the connecting member itself can be reduced.

The cut-away portion shown in FIG. 6 has a predetermined size and shape, and includes a first cut-away portion 1156a positioned on the second surface of the first plate 152 at the inside of the bent portion 160 and a second cut-away portion 1156b positioned on the first surface of the first plate 152 at the outside of the bent portion 160. The first cut-away portion 1156a is formed by removing a portion (but not all) of the second insulating layer 154b on the second surface of the first plate 152 so that the second surface of the first plate 152 is not exposed to the exterior at the inside of the bent portion 160. Similarly, the second cut-away portion 1156b is formed by removing a portion (but not all) of the first insulating layer 154a to have a predetermined depth and shape on the first surface of the first plate 152 so that the first surface of the first plate 152 is not exposed to the exterior at the outside of the bent portion 160.

According to the aforementioned configuration, the bending elasticities of the first and second insulating layers 154a and 154b are respectively removed at the outside and inside of the bent portion 160, so that the restoring force for the bent portion of the connecting member can be considerably removed. Therefore, the bending elasticity of the connecting member itself can be substantially removed.

When the connecting member is bent, the inside of the bent portion corresponds to a side folded at an angle smaller than 180 degrees, and the outside of the bent portion corresponds to a side opposite to the inside of the bent portion. The aforementioned embodiments have been described when the bent portion is approximately vertically folded.

FIGS. 7 to 10 are partial plan views of connecting members illustrating the structures of cut-away portions with various shapes according to additional embodiments of the present invention. For clear illustration of the cut-away portions, the bent portion of the connecting member is shown as unfolded flat in FIGS. 7 to 10.

Figure 7:
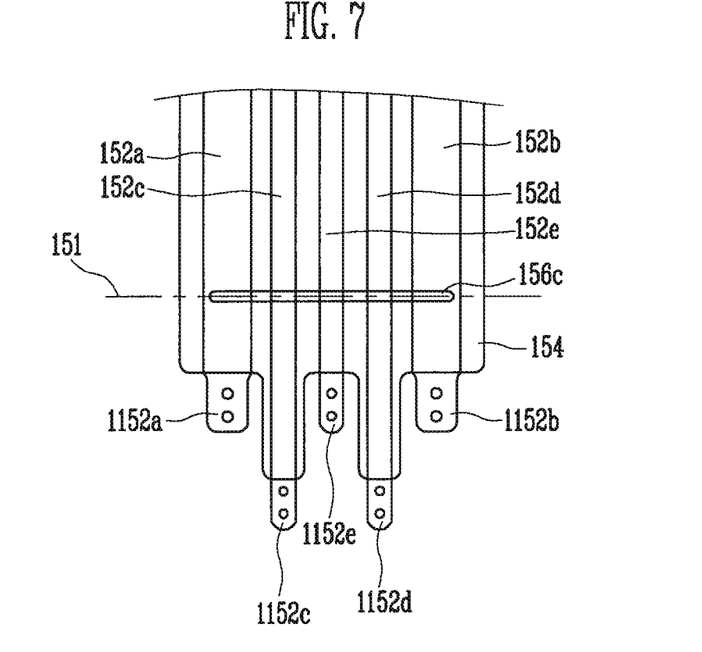
FIGS. 7 to 10 are partial plan views of connecting members illustrating the structures of cut-away portions with various shapes, applicable to the secondary battery pack according to additional embodiments of the present invention.

Referring to FIG. 7, the connecting member is provided with a conductive first plate including a plurality of conductive patterns and an insulating second plate 154 that surrounds the first plate. As shown in FIG. 7, the conductive first plate includes first to fifth conductive patterns 152a, 152b, 152c, 152d and 152e. The first and second conductive patterns 152a and 152b may be wires for power supply, respectively connected to positive and negative electrodes of batteries. The third and fourth conductive patterns 152c and 152d may be wires to measure voltages of batteries or banks. The fifth conductive pattern 152e may be a spare or dummy wire. The width of each of the first and second conductive patterns 152a and 152b is wider than that of each of the third, fourth and fifth conductive patterns 152c, 152d and 152d.

As shown in FIG. 7, the first to fifth conductive patterns 152a, 152b, 152c, 152d and 152e extend parallel in one direction while being spaced apart from one another at a predetermined interval. The third to fifth conductive patterns 152c, 152d and 152e are disposed between the first and second conductive patterns 152a and 152b. The insulating second plate 154 is disposed between conductive patterns adjacent to the first and second surfaces of each of the conductive patterns.

As shown in FIG. 7, the connecting member is provided with at least one cut-away portion 156c having a predetermined shape and size. The cut-away portion 156c extends to intersect the conductive patterns at the inside, the outside or both sides of the bent portion. The cut-away portion 156c may be formed at the first surface, the second surface, or both surfaces of the first plate including the first to fifth conductive patterns. The cut-away portion 156c may be formed so that the surface of the first plate is exposed or is not exposed. The shape of the cut-away portion may correspond to a combined shape of the cut-away portions shown in FIGS. 4 to 6.

End portions 1152a, 1152b, 1152c, 1152d and 1152e of the first to fifth conductive patterns are connected to the protection circuit board 140 illustrated in FIGS. 1 and 2. The first plate of the connecting member and the protection circuit module 140 may be connected to each other by soldering, for example. The material of the conductive patterns may include, for example, gold, silver, copper, aluminum, nickel, metal using a combination thereof, and metal oxide.

By using the stripe-shaped cut-away portion 156c extending in the width direction of the connecting member at the bent portion of the connecting member having a band shape with a predetermined width, the bending elasticity of the stacked structure of the first and second plates can be effectively reduced. In FIG. 7, reference numeral 151 denotes a bent line indicating a portion at which the connecting member is folded at the bent portion.

Figure 8:
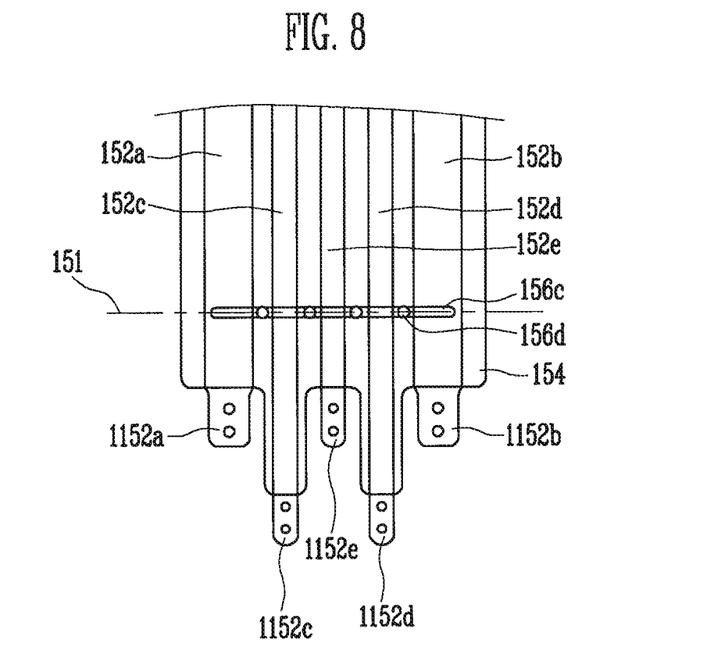

The cut-away portion shown in FIG. 8 includes a cut-away portion 156c extending in the width direction of the connecting member at the bent portion of the connecting member, and a least one hole 156d provided between conductive patterns adjacent to each other on the extension line of the cut-away portion 156c or the bent line 151.

As shown in FIG. 8, four holes 156d are disposed to pass through the second plate 154 positioned between conductive patterns adjacent to each other. The use of the at least one hole 156d in addition to the stripe-shaped cut-away portion 156c can effectively reduce the restoring force at the bent portion of the connecting member.

Figure 9:
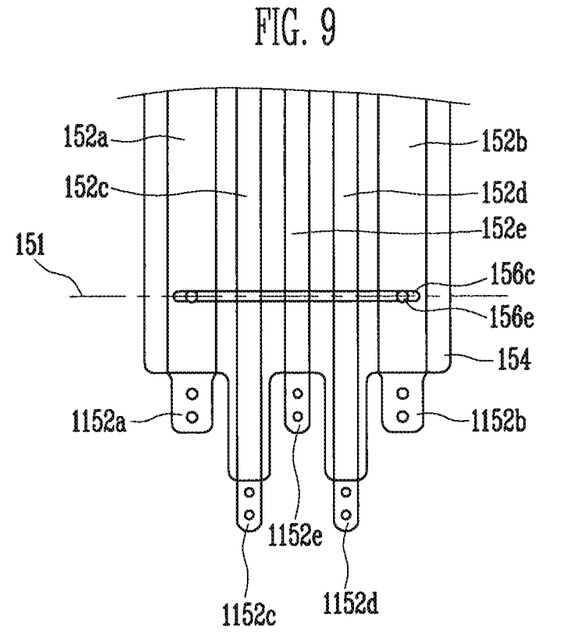

The cut-away portion shown in FIG. 9 includes a cut-away portion 156c extending in the width direction of the connecting member at the bent portion of the connecting member, and at least one hole 156d passing through conductive patterns on the extension line of the cut-away portion 156c or the bent line 151. The at least one hole 156e may be disposed to pass through at least one conductive pattern or to pass through the stacked structure of the first and second plates in which at least one conductive pattern is positioned.

As shown in FIG. 9, two holes 156e respectively passing through the first and second conductive patterns 152a and 152b are disposed to pass through the second plate 154 together. The width of each of the first and second conductive patterns 152a and 152b is wider than that of each of the other conductive patterns 152c, 152d and 152e. The use of at least one hole 156e in addition to the stripe-shaped cut-away portion 156c can effectively reduce the restoring force at the bent portion of the connecting member.

Figure 10:
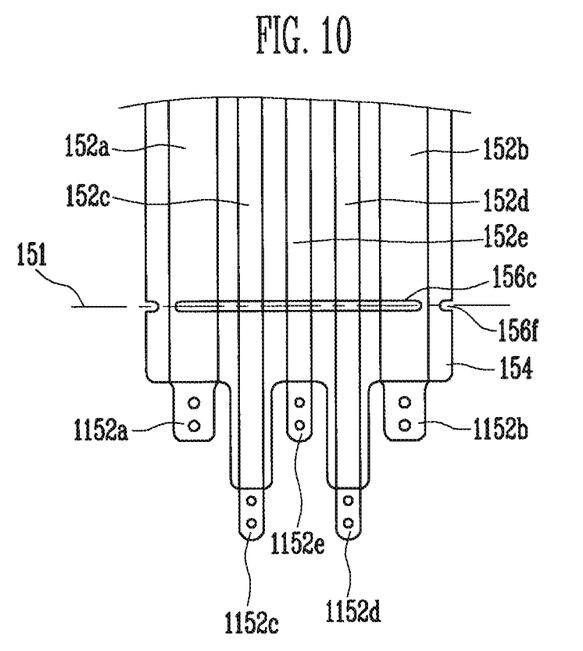

The cut-away portion shown in FIG. 10 includes a cut-away portion 156c extending in the width direction of the connecting member at the bent portion of the connecting member, and a least one round portion 156f positioned at one or both edges of the second plate 154 on the extension line of the cut-away portion 156c or the bent line 151.

As shown in FIG. 10, two round portions 156f respectively correspond to portions of the second plate, positioned at both edges in the width direction of the conductive patterns. Here, the two round portions 156f are cut away in a round shape. The round portions 156f remove the bending elasticity formed at both edges in the width direction of the bent portion of the connecting member. The use of the at least one round portion 156f in addition to the stripe-shaped cut-away portion 156c can effectively reduce the bending elasticity at the bent portion of the connecting member.

Figure 11A:
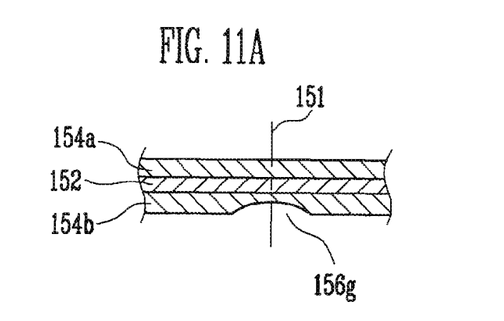
FIGS. 11A and 11B are partially enlarged sectional views illustrating the structures of cut-away portions applicable to the secondary battery pack according to still another embodiment of the present invention.
Figure 11B:
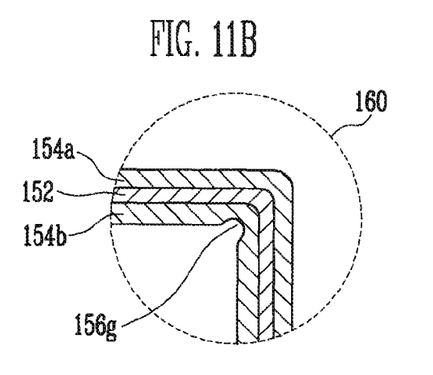

FIGS. 11A and 11B are partially enlarged sectional views illustrating the structures of cut-away portions applicable to the secondary battery pack according to still another embodiment of the present invention. The sectional view of FIG. 11B corresponds to a sectional view formed by cutting away a bent portion of any one of a plurality of conductive patterns in the length direction of the conductive pattern.

Referring to FIG. 11A, a cut-away portion 156g formed at the bent portion of the connecting member may have the section of a gentle circular arc. The gentle circular arc shape corresponds to a circular arc shape having a greater radius than that of the following circular arc shape with a small radius. As illustrated in FIG. 11B, the sectional shape of the cut-away portion 156g at the bent portion has a small circular arc shape, so that it is possible to prevent the second insulating layer 154b of the second plate from being stripped or damaged at the inside of the bent portion while reducing the restoring force of the connecting member at the bent portion. If an unexpected portion of the first plate is exposed to the exterior of the second plate, corrosion of the first plate or short circuits between the conductive patterns may result.

Figure 12:
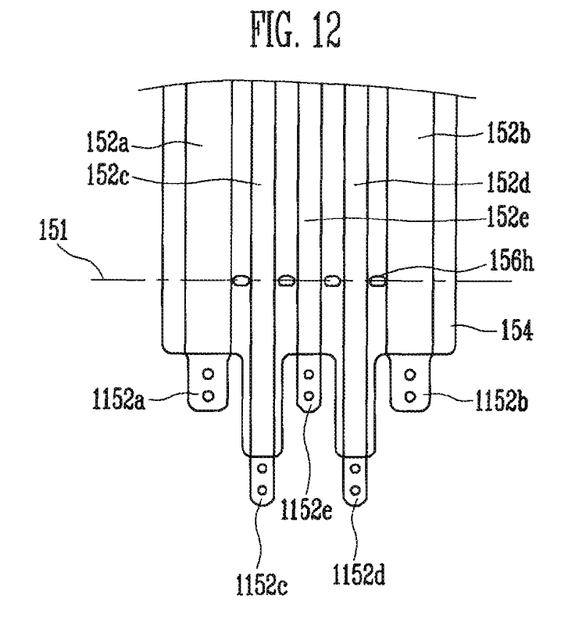
FIGS. 12 to 14 are partially enlarged plan views illustrating the structures of cut-away portions applicable to the secondary battery pack according to other embodiments of the present invention.
Figure 13:
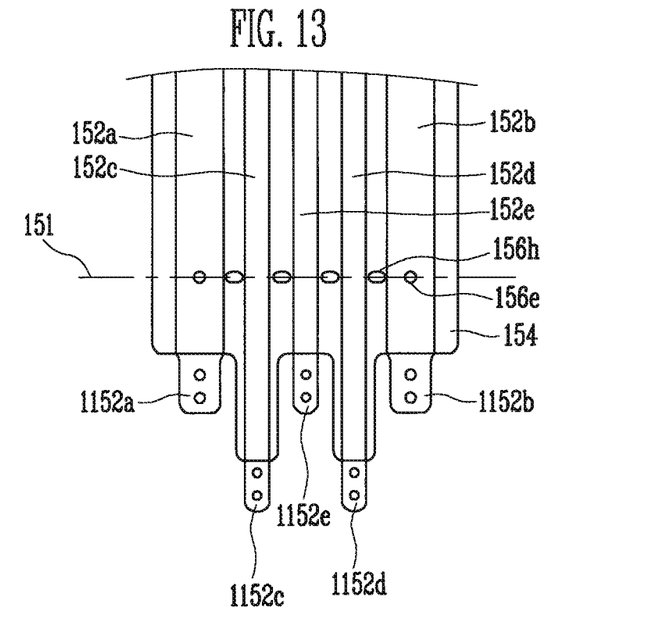
Figure 14:
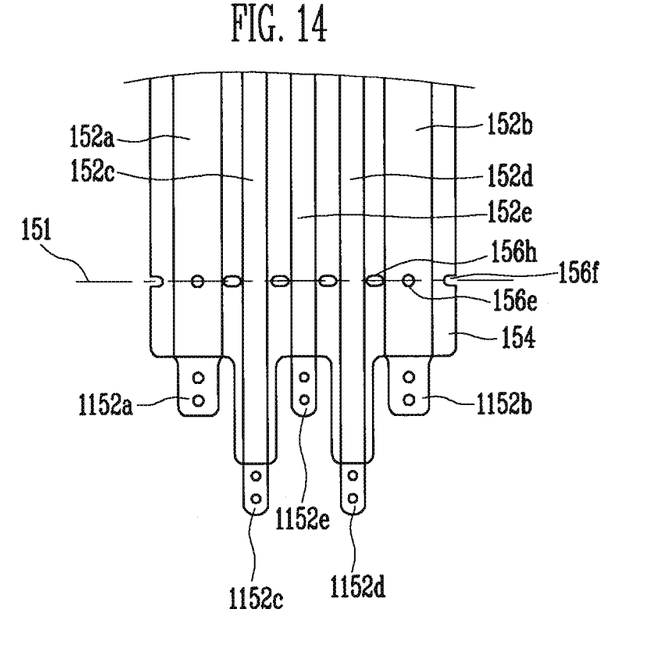

FIGS. 12 to 14 are partially enlarged plan views illustrating the structures of cut-away portions applicable to the secondary battery pack according to other embodiments of the present invention. The cut-away portion shown in FIG. 12 includes a cut-away portion 156h having dots disposed in a line between the plurality of conductive patterns at the inside, the outside, or both sides of the bent portion. The cut-away portion 156h may be formed so that the thickness of the second plate decreases between the first to fifth conductive patterns 152a, 152b, 152c, 152d, and 152e of the first plate or so that at least one portion of the bent portion passes through the second plate. The shape of the cut-away portion 156h corresponds to a combined shape of the cut-away portions of the aforementioned embodiments described with reference to FIGS. 4 to 6 together with FIG. 12. The use of the stripe-shaped cut-away portion 156h with dots, extending in the width direction of the connecting member at the bent portion of the connecting member having a band shape with a predetermined width, can effectively reduce the bending elasticity of the stacked structure of the first and second plates.

Referring to FIG. 13, the cut-away portion includes a cut-away portion 156h with dots extending in a line in the width direction of the connecting member at the bent portion of the connecting member, and at least one hole 156e passing through conductive patterns on the extension line of the cut-away portion 156h or the bent line 151. The at least one hole 156e may be formed to pass through at least one conductive pattern or to pass through the stacked structure of the first and second plates in which at least one conductive pattern is positioned.

As shown in FIG. 13, two holes 156e respectively passing through the first and second conductive patterns 152a and 152b are disposed to pass through the second plate 154 together. Here, the width of each of the first and second conductive patterns 152a and 152b is wider than that of each of the other conductive patterns 152c, 152d, and 152e. The use of the at last one hole 156e in addition to the cut-away portion 156h with dots disposed in a line can effectively reduce the restoring force at the bent portion of the connecting member.

The cut-away portion shown in FIG. 13 includes a cut-away portion 156h with dots extending in a line in the width direction of the connecting member at the bent portion of the connecting member, at least one hole 156e passing through conductive patterns on the extension line of the cut-away portion 156h or the bent line 151, and at least one round portion 156f positioned at one or both edges of the second plate 154 on the extension line of the cut-away portion 156c or the bent line 151. The round portion 156f corresponds to a portion of the second plate, positioned at one or both edges in the width direction of the conductive patterns. The round portions 156f are cut away in a round shape. The use of the at least one hole 156e and the at least one round portion 156f in addition to the cut-away portion 156h with dots disposed in a line can effectively reduce the bending elasticity at the bent portion of the connecting member.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery pack comprising:
   at least one secondary battery;
   a case accommodating the battery;
   a protection circuit module to protect the battery; and
   a connecting member connecting the at least one secondary battery to the protection circuit module,
   wherein the connecting member comprises:
   a conductive first plate; and
   an insulating second plate surrounding the first plate on a first surface of the first plate and a second surface of the first plate opposite the first surface,
   wherein the second plate has at least one cut-away portion on a bent portion of the first plate.

2. The secondary battery pack according to claim 1, wherein the cut-away portion is a portion at which the second plate is removed on a surface of the first plate.

3. The secondary battery pack according to claim 1, wherein the cut-away portion is positioned at an inside of the bent portion of the first plate.

4. The secondary battery pack according to claim 1, wherein the cut-away portion is positioned at an outside of the bent portion of the first plate.

5. A secondary battery pack comprising:
   at least one secondary battery;
   a case accommodating the battery;
   a protection circuit module to protect the battery; and
   a connecting member connecting the at least one secondary battery to the protection circuit module,
   wherein the connecting member comprises:
   a first plate; and
   a second plate surrounding the first plate,
   wherein the second plate has at least one cut-away portion on a bent portion of the first plate,
   wherein the at least one cut-away portion comprises cut-away portions respectively positioned at an inside and an outside of the bent portion, of the first plate.

6. The secondary battery pack according to claim 1, wherein the cut-away portion extends to intersect a plurality of conductive patterns of the first plate.

7. The secondary battery pack according to claim 6, further comprising at least one hole passing through the second plate between the conductive patterns.

8. A secondary battery pack comprising:
   at least one secondary battery;
   a case accommodating the battery;
   a protection circuit module to protect the battery; and
   a connecting member connecting the at least one secondary battery to the protection circuit module,
   wherein the connecting member comprises:
   a first plate; and
   a second plate surrounding the first plate,
   wherein the second plate has at least one cut-away portion on a bent portion of the first plate,
   wherein the cut-away portion extends to intersect a plurality of conductive patterns of the first plate, and
   wherein the connecting member further comprises at least one hole passing through the first plate and second plate or at least one of the conductive patterns.

9. The secondary battery pack according to claim 6, further comprising a round portion on at least one edge of the second plate in an extension direction of the cut-away portion.

10. The secondary battery pack according to claim 6, wherein the cut-away portion has a circular arc-shaped section.

11. The secondary battery pack according to claim 1, wherein the cut-away portion is formed by removing a portion of the second plate between conductive patterns of the first plate so as to decrease a thickness of the bent portion.

12. The secondary battery pack according to claim 11, further comprising at least one hole passing through the second plate at the cut-away portion.

13. A secondary battery pack comprising:
   at least one secondary battery;
   a case accommodating the battery;
   a protection circuit module to protect the battery; and
   a connecting member connecting the at least one secondary battery to the protection circuit module,
   wherein the connecting member comprises:
   a first plate; and
   a second plate surrounding the first plate,
   wherein the second plate has at least one cut-away portion on a bent portion of the first plate,
   wherein the cut-away portion is formed by removing a portion of the second plate between conductive patterns of the first plate so as to decrease a thickness of the bent portion, and
   wherein the connecting member further comprises at least one hole passing through at least one of the conductive patterns.

14. The secondary battery pack according to claim 11, further comprising a round portion on at least one edge of the insulating second plate in a direction extending to intersect the conductive patterns.

15. The secondary battery pack according to claim 11, wherein the cut-away portion has a circular arc-shaped section.

16. The secondary battery pack according to claim 1, wherein the batteries are connected to one another in series, parallel, or combination of series and parallel.

17. The secondary battery pack according to claim 16, wherein the connecting member comprises a flexible printed circuit board comprising the first plate and the second plate.

18. The secondary battery pack according to claim 1, further comprising at least one of a first welding point at a contact portion between the first plate and the protection circuit module or a second welding point at a contact portion between the first plate and the battery.

* * * * *

UNITED STATES PATENT AND TRADEMARK OFFICE
CERTIFICATE OF CORRECTION

| | | |
|---|---|---|
| PATENT NO. | : 8,440,344 B2 | Page 1 of 1 |
| APPLICATION NO. | : 12/893952 | |
| DATED | : May 14, 2013 | |
| INVENTOR(S) | : Jang-Gun Ahn | |

It is certified that error appears in the above-identified patent and that said Letters Patent is hereby corrected as shown below:

On the Title Page

(56) References Cited,                Delete "retrived"
Other Publications, line 1            Insert -- retrieved --

(56) References Cited,                Delete "retrived"
Other Publications, line 3            Insert -- retrieved --

In the Claims

Column 9, Claim 5, line 38            Delete "portion,"
                                      Insert -- portion --

Signed and Sealed this
Fourteenth Day of October, 2014

Michelle K. Lee
*Deputy Director of the United States Patent and Trademark Office*

UNITED STATES PATENT AND TRADEMARK OFFICE
CERTIFICATE OF CORRECTION

Page 1 of 1

PATENT NO.         : 8,440,344 B2
APPLICATION NO.    : 12/893952
DATED              : May 14, 2013
INVENTOR(S)        : Jang-Gun Ahn It is certified that error appears in the above-identified patent and that said Letters Patent is hereby corrected as shown below:

On the Title Page

(56) References Cited,        Delete "retrived"
Other Publications, line 1    Insert -- retrieved --

(56) References Cited,        Delete "retrived"
Other Publications, line 3    Insert -- retrieved --

In the Claims

Column 9, Claim 5, line 37    Delete "portion,"
                              Insert -- portion --

This certificate supersedes the Certificate of Correction issued October 14, 2014.

Signed and Sealed this
Sixteenth Day of February, 2016

Michelle K. Lee
*Director of the United States Patent and Trademark Office*